(12) United States Patent
Riley et al.

(10) Patent No.: US 10,518,489 B2
(45) Date of Patent: Dec. 31, 2019

(54) COMPOSITE STRUCTURES INCORPORATING ADDITIVE MANUFACTURED COMPONENTS

(71) Applicant: Aurora Flight Sciences Corporation, Manassas, VA (US)

(72) Inventors: P. Graves H. Riley, Manassas, VA (US); Daniel S. Campbell, Manassas, VA (US); Daniel Cottrell, Manassas, VA (US)

(73) Assignee: Aurora Flight Sciences Corporation, Manassas, VA (US)

(*) Notice: Subject to any disclaimer, the term of this patent is extended or adjusted under 35 U.S.C. 154(b) by 115 days.

(21) Appl. No.: 15/703,510

(22) Filed: Sep. 13, 2017

(65) Prior Publication Data

US 2019/0077098 A1    Mar. 14, 2019

(51) Int. Cl.
| | | |
|---|---|---|
| *B29C 70/68* | (2006.01) | |
| *B29C 70/34* | (2006.01) | |
| *B33Y 80/00* | (2015.01) | |
| *B29C 70/54* | (2006.01) | |
| *B29C 70/70* | (2006.01) | |
| *B29K 101/12* | (2006.01) | |
| *B29L 31/30* | (2006.01) | |

(52) U.S. Cl.
CPC .............. *B29C 70/68* (2013.01); *B29C 70/34* (2013.01); *B29C 70/545* (2013.01); *B29C 70/70* (2013.01); *B33Y 80/00* (2014.12); *B29K 2101/12* (2013.01); *B29L 2031/3082* (2013.01)

(58) Field of Classification Search
CPC ...................................................... B29C 70/68
USPC ............................................................ 428/43
See application file for complete search history.

(56) References Cited

U.S. PATENT DOCUMENTS

| | | |
|---|---|---|
| 2010/0121475 A1 | 5/2010 | Lyons |
| 2016/0167317 A1 | 6/2016 | Bergmann et al. |

FOREIGN PATENT DOCUMENTS

| | | | |
|---|---|---|---|
| EP | 3124221 | 2/2017 | |
| EP | 3181325 | 6/2017 | |
| EP | 3181325 A1 * | 6/2017 | ............. B29C 70/74 |

OTHER PUBLICATIONS

Extended European search report for Application No. 18192309.5, dated Jan. 28, 2019.

* cited by examiner

*Primary Examiner* — Brent T O'Hern
(74) *Attorney, Agent, or Firm* — Michael Stanley Tomsa; McAndrews, Held & Malloy, Ltd.; Eugene H. Nahm (57) ABSTRACT

A method of manufacturing a composite structure, comprises applying a first composite layer to a tooling surface of a tool positioning an additive manufactured component over at least a portion of the first composite layer, and applying a second composite layer over at least a portion of the composite layer and at least a portion of the additive manufactured component, wherein at least a portion of the additive manufactured component is embedded between the first and second composite layers.

13 Claims, 10 Drawing Sheets

COMPOSITE STRUCTURES INCORPORATING ADDITIVE MANUFACTURED COMPONENTS

TECHNICAL FIELD

The present disclosure is directed the use of additive manufacturing in combination with composite structures and, more specifically to the incorporation of additive manufactured components into composite structures.

BACKGROUND

Over recent years, composite materials have become an increasingly desirable material for aircraft structures. Composite materials typically comprise strands of fibers (e.g., glass- and/or carbon-fiber) mixed with a resin. For example, many commercially produced composites use a polymer matrix material as the resin. Common composite materials used on airplanes include fiberglass, carbon fiber, and fiber-reinforced matrix systems, or any combination of any of these. In fact, there are many different polymers available, depending upon the starting raw ingredients. The more common polymer may include, for example, polyester, vinyl ester, epoxy, phenolic, polyimide, polyamide, polypropylene, and PEEK. During fabrication, fibers may be often wound, or woven, into a sheet of material and then impregnated (e.g., infused) with a resin. Once the fibers have been impregnated with a resin, the composite material may then be formed into the desired shape and cured until properly hardened.

Composite materials have an advantage of being extremely lightweight and having high strength. As a result, they are useful in, among other things, aircraft applications. Additionally, composite structures may be molded into desired shapes and configurations. While many parts manufactured using composite materials could also be made from metal, a metallic part of the same strength and stiffness would be significantly heavier.

However, manufacturing components using composite materials can be time-consuming and labor intensive, especially when complex structures are needed. An additional drawback of certain composite materials is the actual assembly, or joining, of the composite materials. Unlike more traditional materials (e.g., metals), different considerations must be made for assembling composite materials. For example, placing holes in composite materials for attachment of fasteners severs the strands of fibers within the material and creates weak points within the material. While forming holes in the composite material by displacing the strands of the uncured fibers prevents severing of the fibers, this process is time-consuming and often impractical. Another alternative for assembling composite materials is the use of high-strength epoxies. Epoxies have an advantage of limiting the number of manufacturing steps. However, the distribution of the epoxy and the placement of the parts together can require expensive machines and numerous jigs (e.g., tooling). Moreover, such structures routinely involve multiple sets of tools, are very labor intensive, require several cure cycles and can require B-staged material with set expiration dates.

Additive manufacturing techniques, i.e., 3-D printing, are beneficial to traditional composite material manufacturing techniques in that they provide the ability to rapidly produce and iterate printed polymeric components at reduced cost and time in comparison to composite material manufacturing techniques. Additive manufacturing processes also allow implementation of unique features into the printed component, which are difficult to produce using composite manufacturing methods. However, it is difficult for polymers to match the mechanical performance of composite materials. As a result, polymers are often not viable materials for large-scale use in constructing aircraft components.

Accordingly, there is a need in the art, for a method of manufacturing structures that leveraging the benefits of composite materials and additive manufactured components, while alleviating the drawbacks discussed above.

BRIEF SUMMARY OF THE INVENTION

The present disclosure endeavors to provide for the incorporation of additive manufactured components into composite structures.

According to a first aspect, a method of manufacturing a composite structure comprises: applying a first composite layer to a tooling surface of a tool; positioning an additive manufactured component over at least a portion of the first composite layer; and applying a second composite layer over at least a portion of the composite layer and at least a portion of the additive manufactured component, wherein at least a portion of the additive manufactured component is embedded between the first and second composite layers.

In certain aspects, the method further comprises the step of curing the composite structure after applying the second composite layer.

In certain aspects, the method further comprises the step of removing at least a portion of one of the first and second composite layers following curing to expose a portion of the additive manufactured component.

In certain aspects, the method further comprises the step of providing the additive component with a feature to facilitate post-curing removal of at least a portion of one of the first and second composite layers.

In certain aspects, the feature is configured to interface with a cutting tool to facilitate post-curing removal of at least a portion of one of the first and second composite layers.

In certain aspects, the method further comprises the step of providing the additive manufactured component with a feature configured to mate with a second structure for interconnecting the composite structure with the second structure. The second structure may include a composite structure manufactured according to the method above.

In certain aspects, the additive manufacture component is entirely embedded between the first and second composite layers.

In certain aspects, the method further comprises the step of removing a portion of at least one of the first and second composite layers to expose a portion of the additive manufactured component.

In certain aspects, the composite structure is cured prior to removing a portion of at least one of the first and second composite layers.

In certain aspects, the step of removing comprises cutting a portion of at least one of the first and second composite layers.

In certain aspects, the additive manufacture component comprise a printed thermoplastic material.

In certain aspects, the first and second composite layers are formed of the same material.

In certain aspects, the composite structure comprises an aircraft component.

In certain aspects, the method further comprises the step of providing locating features on the tool and the additive manufactured component to facilitate orientation of the additive manufactured component relative to the tool during the position step.

In certain aspects, the locating features comprise magnets.

In certain aspects, the locating features comprise magnets mounted in at least one of the tool and the additive manufactured component.

According to a second aspect, a composite structure comprises: first and second composite layers; and an additive manufactured component at least partially embedded between the first and second composite layers.

In certain aspects, the additive manufactured component comprises an exposed portion that is not embedded between the first and second composite layers.

In certain aspects, the exposed portion includes a connection feature configured to mate with a second structure for interconnecting the composite structure with the second structure.

In certain aspects, the additive component comprises a feature to facilitate removal of at least a portion of one of the first and second composite layers.

In certain aspects, the feature is configured to interface with a cutting tool to facilitate removal of at least a portion of one of the first and second composite layers.

In certain aspects, the additive manufacture component comprise a printed thermoplastic material.

In certain aspects, the first and second composite layers are formed of the same material.

According to a third aspect, a composite structure formed by the process of: applying a first composite layer to a tooling surface of a tool; positioning an additive manufactured component over at least a portion of the first composite layer; and applying a second composite layer over at least a portion of the composite layer and at least a portion of the additive manufactured component, wherein at least a portion of the additive manufactured component is embedded between the first and second composite layers.

In certain aspects, the process further comprises the step of curing the composite structure after applying the second composite layer.

In certain aspects, the process further comprises the step of removing at least a portion of one of the first and second composite layers following curing to expose a portion of the additive manufactured component.

In certain aspects, the process further comprises the step of providing the additive component with a feature to facilitate post-curing removal of at least a portion of one of the first and second composite layers.

In certain aspects, the feature is configured to interface with a cutting tool to facilitate post-curing removal of at least a portion of one of the first and second composite layers.

BRIEF DESCRIPTION OF THE FIGURES

These and other advantages of the present disclosure will be readily understood with the reference to the following specifications and attached drawings wherein.

DETAILED DESCRIPTION

Preferred embodiments of the present disclosure will be described below with reference to the accompanying drawings. In the following description, certain well-known functions or constructions are not described in detail since they would obscure the disclosure in unnecessary detail. For this application, the following terms and definitions shall apply:

As used herein, the words "about" and "approximately," when used to modify or describe a value (or range of values), mean reasonably close to that value or range of values. Thus, the embodiments described herein are not limited to only the recited values and ranges of values, but rather should include reasonable workable deviations.

As used herein, the terms "aerial vehicle" and "aircraft" refer to a machine capable of flight, including, but not limited to, traditional aircraft and vertical takeoff and landing (VTOL) aircraft. VTOL aircraft may include both fixed-wing aircraft, rotorcraft (e.g., helicopters), and/or tilt-rotor/tilt-wing aircraft.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The term "composite laminates" as used herein, refers to a type of composite material assembled from layers (i.e., a "ply") of additive material and a matrix material.

The term "composite structure" as used herein, refers to structures or components fabricated, at least in part, using a composite material, including, without limitation, composite laminates.

The term "exemplary" means serving as a non-limiting example, instance, or illustration. As utilized herein, the terms "e.g.," and "for example" set off lists of one or more non-limiting examples, instances, or illustrations.

The term "tool" and "tooling" as used herein refers to a mold or similar structure used to form a structure, such as a composite structure fabricated from a composite material.

Disclosed herein are techniques for manufacturing composite structures that incorporate additive manufacture components. Additive manufacturing techniques are beneficial to traditional composite material manufacturing techniques in that they provide the ability to rapidly produce and iterate printed thermoplastic material components at reduced cost and time in comparison to composite material manufacturing techniques. Additive manufacturing also allows the creation of complex shapes and features that can be difficult to achieve with composite manufacturing methods. For example, as described below, features can be formed in printed thermoplastic components to facilitate interconnection of composite structures that incorporate such printed thermoplastic components.

A printed thermoplastic material component, whether a single piece component or a multi-piece component, may be printed through one or more additive manufacturing techniques, also referred to as three-dimensional (3D) printing. Additive manufacturing generally refers to processes used to fabricate a 3D object in which successive layers of material (e.g., thermoplastic) are formed under computer control to create the 3D object (e.g., a printed material tool, such as a printed thermoplastic material part or component), which can be of almost any shape or geometry. The printed thermoplastic material component may be produced from digital model data or another electronic data source such as an additive manufacturing file (AMF) file (e.g., a Stratasys CMB file). In other words, the designer can create the design model for a printed thermoplastic material component in a digital space using a modeling program (e.g., a computer-aided design (CAD) package). An advantage of design model created with CAD (as opposed to scanning) is the reduction in errors, which can be corrected before printing the 3D object, thereby allowing verification in the design of the object before it is printed.

Additive manufacturing techniques print objects in three dimensions, therefore both the minimum feature size (i.e., resolution) of the XY plane (horizontal resolution) and the layer height in Z-axis (vertical resolution) are considered in overall printer resolution. Horizontal resolution is the smallest movement the printer's extruder can make within a layer on the X and the Y axis, while vertical resolution is the minimal thickness of a layer that the printer produces in one pass. Printer resolution describes layer thickness and X-Y resolution in dots per inch (dpi) or micrometers (μm). The particles (3D dots) in the horizontal resolution can be around 50 to 100 μm (510 to 250 DPI) in diameter. Typical layer thickness (vertical resolution) is around 100 μm (250 DPI), although the layers may be as thin as 16 μm (1,600 DPI). The smaller the particles, the higher the horizontal resolution (i.e., higher the details the printer produces). Similarly, the smaller the layer thickness in Z-axis, the higher the vertical resolution (i.e., the smoother the printed surface will be). The printing process in a higher vertical resolution printing, however, will take longer to produce finer layers as the printer has to produce more layers. Accordingly, the printed thermoplastic material component can be printed with great accuracy and with numerous details, which is particularly advantageous, for example, in creating components requiring complex and/or precise features.

Figure 1:
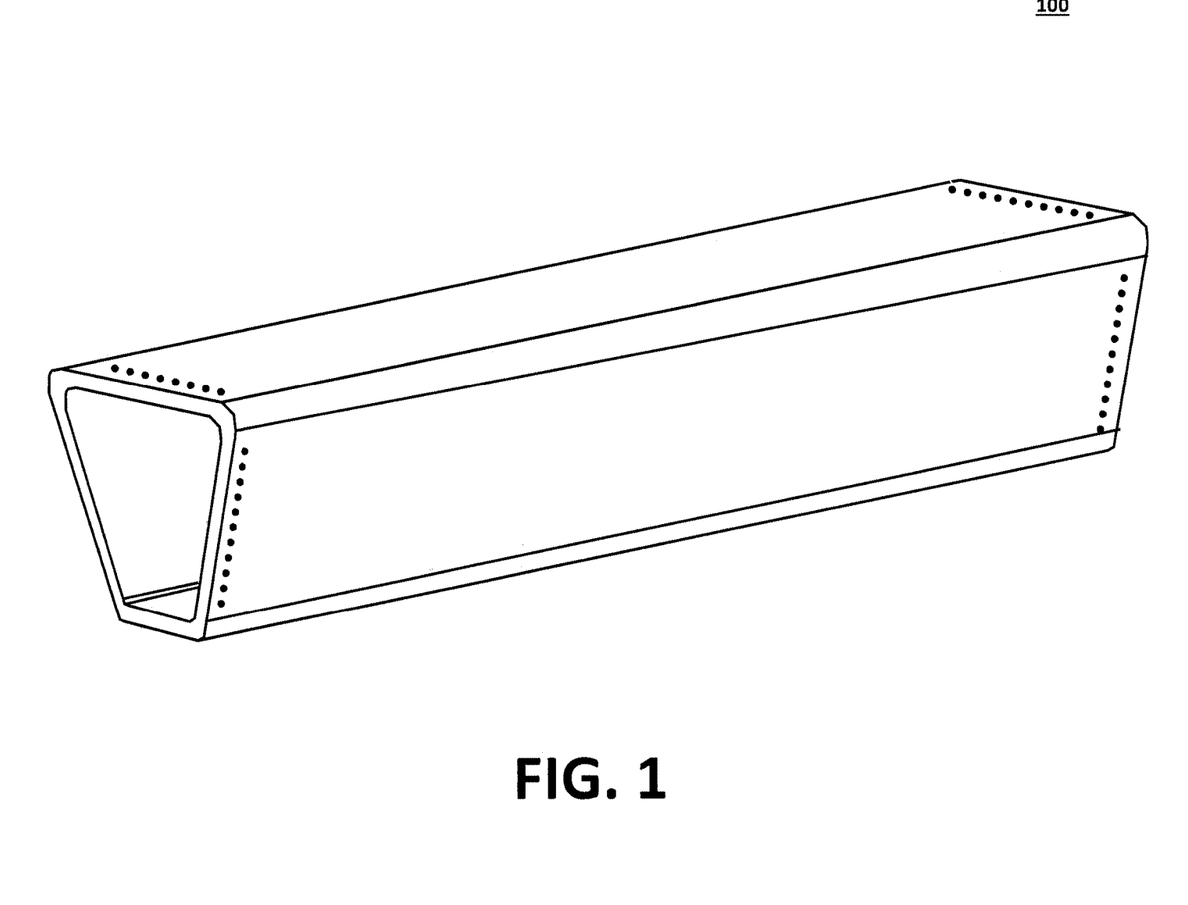
FIG. 1 illustrates an exemplary embodiment of a composite structure with embedded additive manufactured components.

FIG. 1 illustrates an exemplary embodiment of a composite structure with embedded additive manufactured components. Specifically, FIG. 1 is a generic and simplified aircraft fuselage structure 100 that shown for explanation purposes. Traditional composite manufacturing processes are expensive and labor intensive. Through the selective incorporation of additive manufactured components into composite structures, the overall cost, time, and skill required to manufacture composite structures, such as aircraft parts, can be reduced. For example, as discussed below, the benefits of additive manufacturing can be leveraged into the manufacture of composite structures, such as a fuselage structure, by splitting a fuselage structure into sections, e.g., along a natural mold lines, and using 3D printed joint component to interconnect the completed sections of the fuselage structure. For example, the 3D printed joint components can be embedded into (and co-cured with) the composite material during construction of the fuselage sections. In certain aspects, portions of the joint components may be exposed (either pre or post cure) to allow the fuselage sections to be interconnected via the mating 3D printed joint structures to assemble the completed fuselage structure.

Figure 2A:
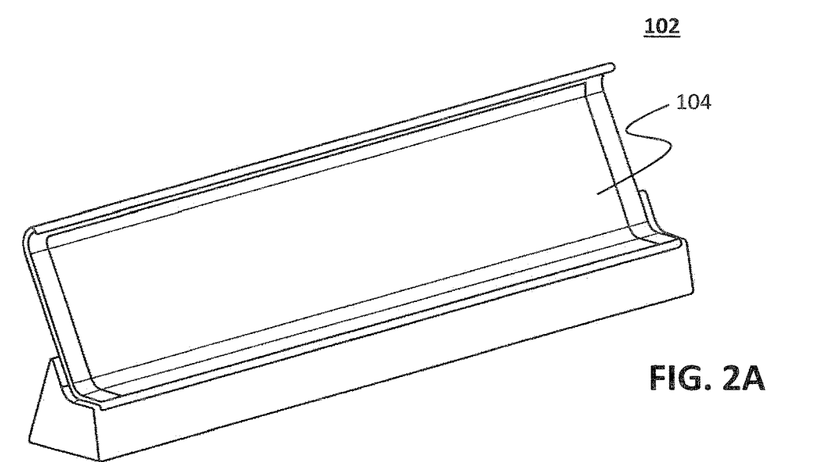
FIGS. 2A through 2H illustrate a method of manufacturing a composite structure with embedded additive manufactured components.

FIGS. 2A through 2H illustrate a method of manufacturing a composite structure with embedded additive manufactured components, such as the exemplary fuselage structure 100 of FIG. 1. FIG. 2A illustrates a cross-sectional view of an exemplary manufacturing tool 102 that can be used in manufacturing a composite structure with embedded additive manufactured (e.g., 3D printed plastic) components according to certain aspects of the present disclosure. The tool 102 includes a tooling surface 104 that defines a predetermined shape for the resulting composite structure. For example, in the illustrated embodiment, the tooling surface may correspond to a section of the aircraft fuselage structure 100. Other sections (not shown) of the fuselage structure can be manufactured in a similar fashion.

The manufacturing tool 102 may be constructed in accordance with the principles described in co-pending commonly-owned U.S. Provisional Patent Application Ser. No. 62/410,181, which was filed on Oct. 19, 2016, is entitled "Increased Utility Composite Tooling through Additive Manufacturing," the entire disclosure of which is incorporated herein by reference. The tool 102 may be fabricated from a printed thermoplastic material, such a high-performance fused deposition modeling (FDM) thermoplastic. Suitable printed thermoplastic materials include, for example, polyetherimide (PEI), which offers excellent strength, thermal stability, and the ability to withstand autoclaving (high pressure and temperature). Polycarbonate is a suitable material for printed thermoplastic material tools due to its lower cost and ability to withstand the required 250° F. temperatures; however, other materials are contemplated as material selection is driven by the cure temperature for a given composite component. Therefore, other materials with higher, or lower, temperature tolerances may be employed depending on the application (e.g., the type of composite material).

Figure 2B:
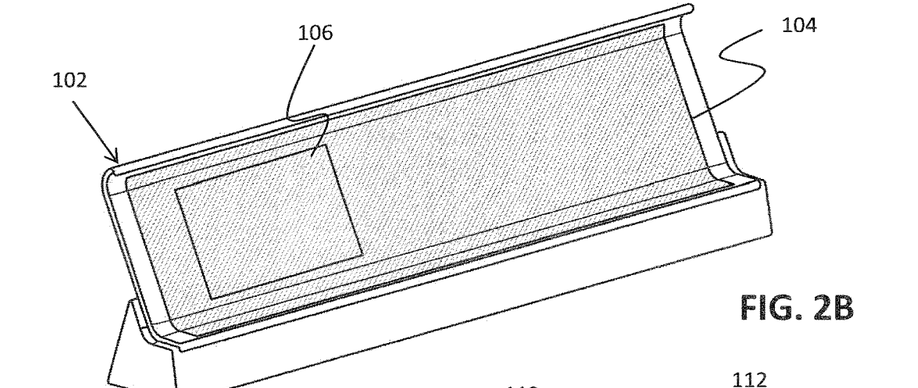

In FIG. 2B, a first (e.g., outer) composite layer 106 is applied to the tooling surface 104 of the tool 102. The first composite layer 106 may be one of any number of composite materials. Suitable composite materials for aerial vehicles, include, without limitation, 977-3 resin and IM7/977-3 pre-preg available from Cytec Industries, which is a toughened epoxy resin with 350° Fahrenheit (F.) (177° C.) dry and 270° F. (132° C.) wet service capability. Other types of composite materials may be used, however. Accordingly, the tool 102 is capable of withstanding multiple cure cycles at, for example, at least 350° F. and a pressure of at least 90 pounds per square inch (PSI). As can be appreciated by those of ordinary skill in the art, the term pre-preg refers to "pre-impregnated" composite fibers where a material, such as epoxy is already present, in the composite fibers. Initially, pre-preg is flexible and sticky, but becomes hard and stiff once it has been heated (i.e., during the curing process) and cooled. The first composite layer 106 may consist of a single layer or multiple layers of composite material. When multiple layers are used, the same or different composite materials may be used to form the first composite layer 106.

Figure 2C:
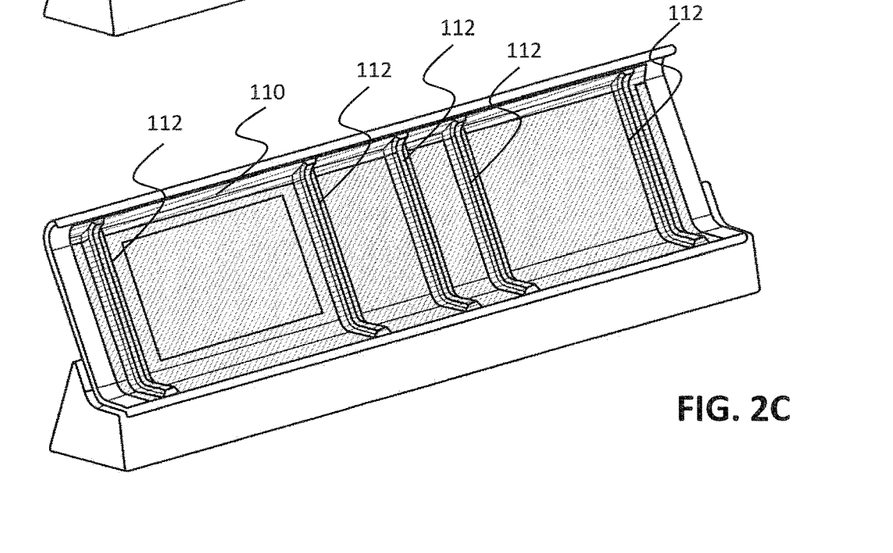
Figure 2D:
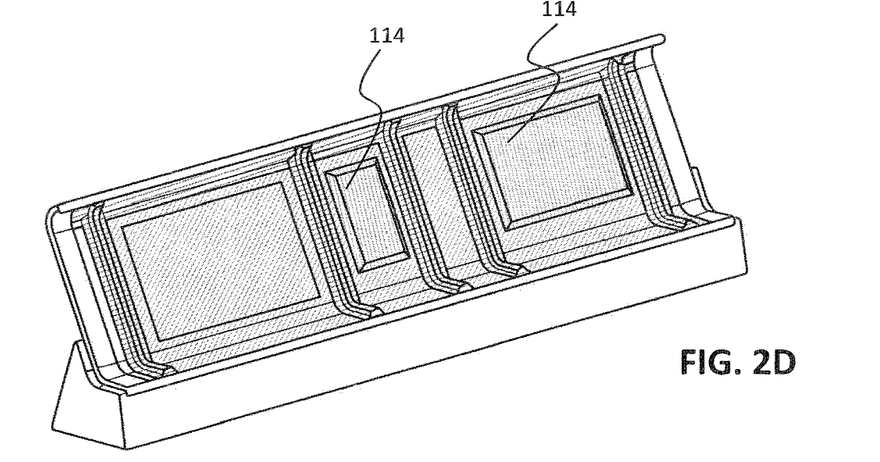

Next, in FIG. 2C-2D, one or more additive manufactured components are positioned at selected locations over at least a portion of the first composite layer 106. The tool 102 may be fabricated from a printed thermoplastic material, such a high-performance fused deposition modeling (FDM) thermoplastic or polycarbonate. As noted above, suitable printed thermoplastic materials include, for example, polyetherimide (PEI), Polycarbonate, etc.

Figure 2E:
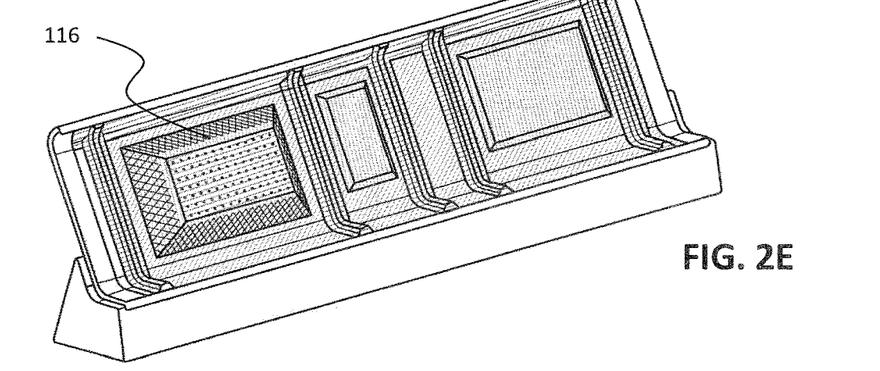

In the illustrated embodiment, the additive manufactured components include a skin joiner 110 that runs horizontally along the top edge of the first composite layer 106 and a plurality of pi-clips 112 that run vertically (i.e., perpendicular to the skin joiner 110) between the top and bottom of the first composite layer. (See FIG. 2C). Additional additive manufactured components that are installed over the first composite layer may include core panels 114 (FIG. 2D) and an additive manufactured antenna 116 (FIG. 2E). As explained in greater detail below, locating features may be provided, e.g., on the tool 102 and/or the additive manufactured components 110-116 to facilitate orientation of the additive manufactured component relative to the tool (and the first composite layer) when the additive manufactured components are being installed over the first composite layer.

Figure 2F:
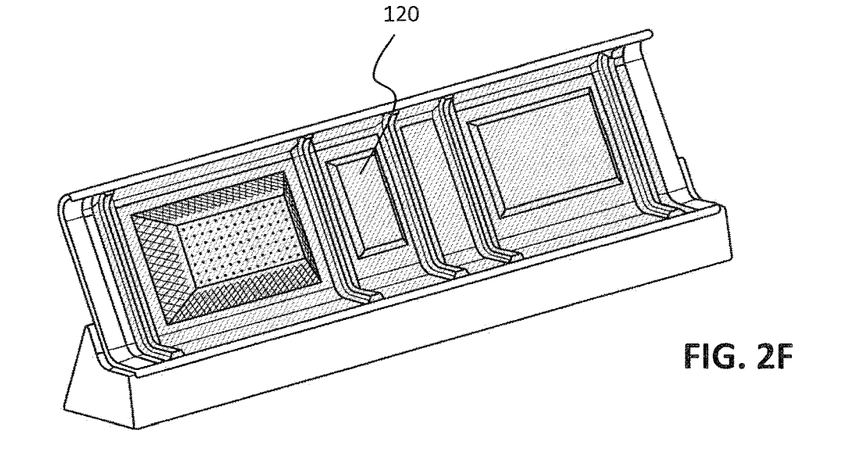
Figure 2G:
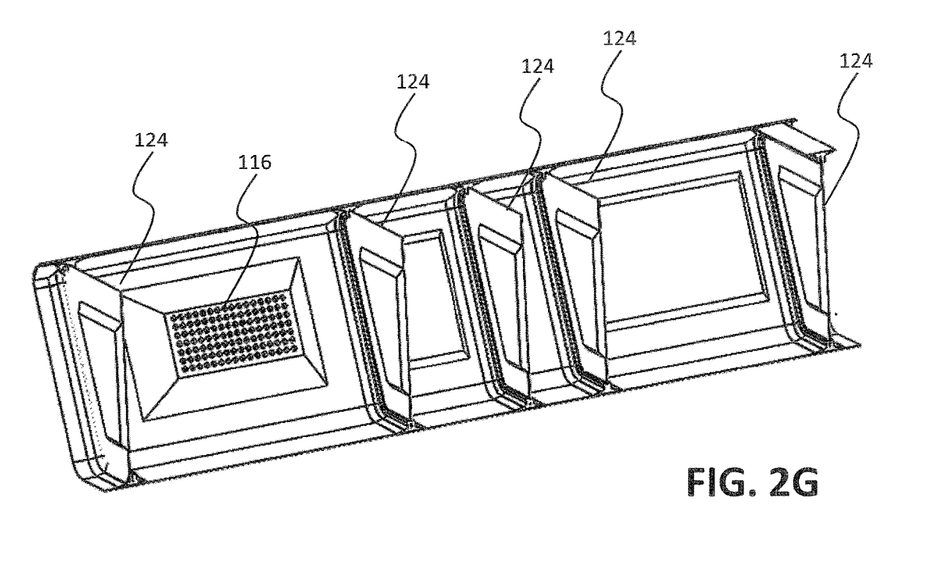
Figure 2H:
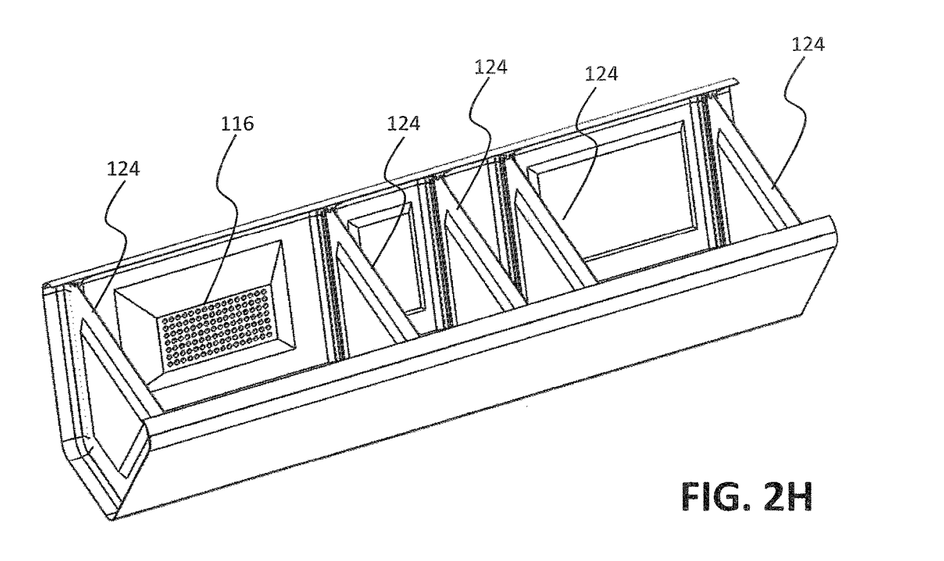

Next, in FIG. 2F, a second or inner composite layer 120 is applied over at least a portion of the first composite layer 106 and at least a portion of the additive manufacture components 110-116 such that at least a portion of the additive manufactured components are embedded between the first and second composite layers 104, 120. In the illustrated embodiment, the second composite layer 120 is generally coextensive with the first composite layer and the additive manufactured components 110-116 are completely or nearly completely embedded (or encapsulated) between the first and second composite layers. As with the first composite layer 106, the second composite layer 120 may be comprised of multiple layers of the same or different composite materials. Likewise, the first and second composite layers 106, 120 may comprise the same or different composite materials.

Following application of the second composite layer 120, the resulting structure, (i.e., composite structure with embedded additive manufacture components) and tool 102 may be bagged and cured in accordance with, for example, the bagging principles described in co-pending commonly-owned U.S. Patent Publication No. 2015/0210019A1, which was published on Jul. 30, 2015 and titled "Methods For Combining Components Of Varying Stages Of Cure," the entire disclosure of which is incorporated herein by reference. Once the composite structure is properly cured, the tool 102 may be broken down to allow for removal of the cured structure from the tool 102 (see, e.g., FIGS. 2G and 2H, which illustrate cross sectional and isometric views of a cured composite structure).

Following curing, portions of the composite material layers 106, 120 may be removed (e.g., by cutting or trimming) to expose selected portions of the additive manufactured components. For example, in the illustrated example, sections of the second (inner) composite layer 120 are trimmed to expose selected portions of the pie-clips 112, skin joiners 110, and antenna 116. With the pi-clips and skin joiners 110 appropriately trimmed, bulkheads 124 can be slid into place in the pi-clips (see, e.g., FIGS. 2G and 2H) and secured in place with appropriate means, such as by bonding with epoxy or tape.

Figure 3A:
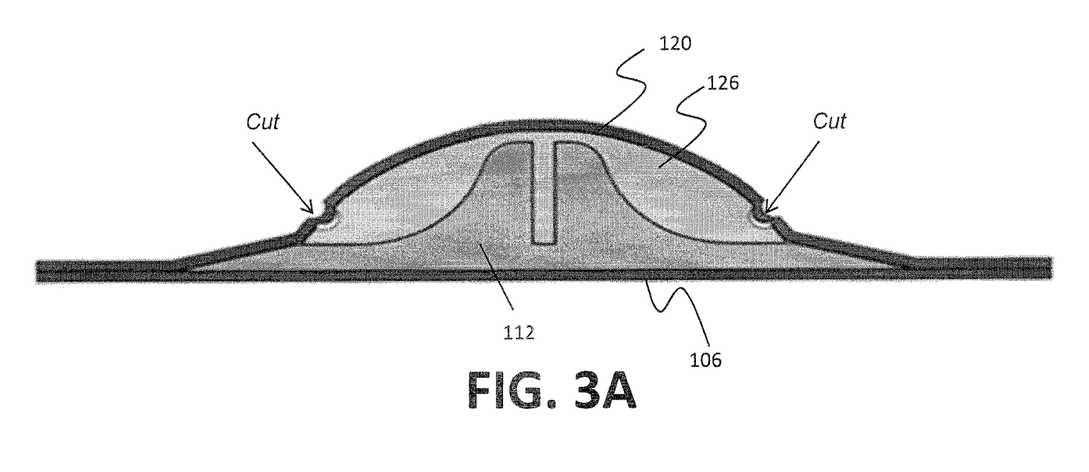
FIGS. 3A and 3B illustrate an additive manufactured sacrificial cap and an additive manufactured sacrificial pi-clip that are co-cured between composite layers according an exemplary embodiment.
Figure 3B:
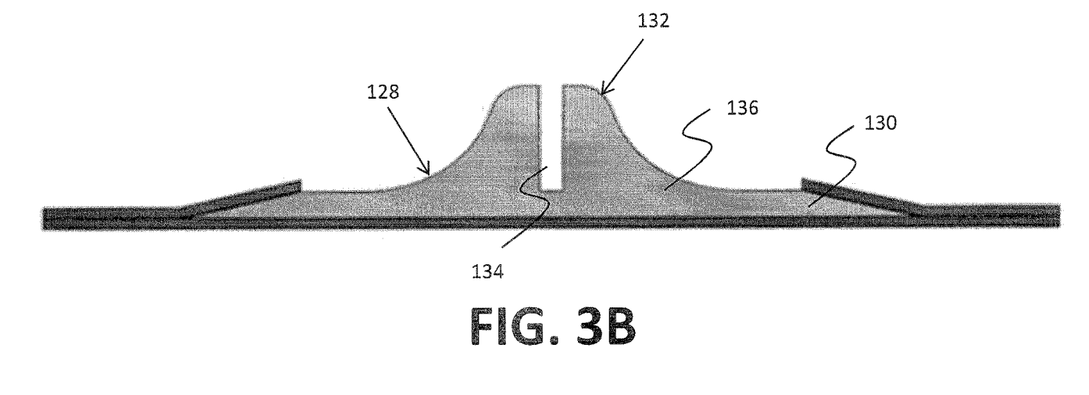

According to certain aspects of embodiments of the present disclosure, sacrificial components, which may be additively manufactured, may be embedded between the composite layers and subsequently removed after the curing process. For example, FIGS. 3A and 3B illustrate an additive manufactured sacrificial cap 126 that is co-cured with the pi-clip 112 between the composite layers 106, 120. After curing, the second composite layer 120 is cut or trimmed to allow removal of the additive manufactured sacrificial cap 126. As illustrated, the additive manufactured sacrificial cap 126 may be shaped to define channels to assist in cutting through the second composite layer 120. Once the cap 126 is removed, a portion 128 of the pi-clip is exposed (see FIG. 4B) while a portion 130 of the pi-clip 112 remains embedded between the first and second composite layers 106, 120 to secure the pi-clip 112 in place. An advantage of this technique is that it makes it easier for the various components to bond more quickly.

The exposed portion 128 of the pi-clip 112 presents an interface 132 configured to mate with one of the bulkheads 124. According to certain embodiments, the bulkhead 124 may also be manufactured as a composite structure with embedded additive manufactured components. According to one exemplary embodiment, the bulkhead 124 includes an additive manufactured component that presents a mounting interface which reciprocally mates with the mounting interface (e.g., slot 134 and profile 136) of the pi-clip 112 to position the bulkhead relative the fuselage section. As illustrated, the bulkhead 124 may be slid onto the pi-clip 112 (e.g., the slot 134) and bonded.

Figure 4A:
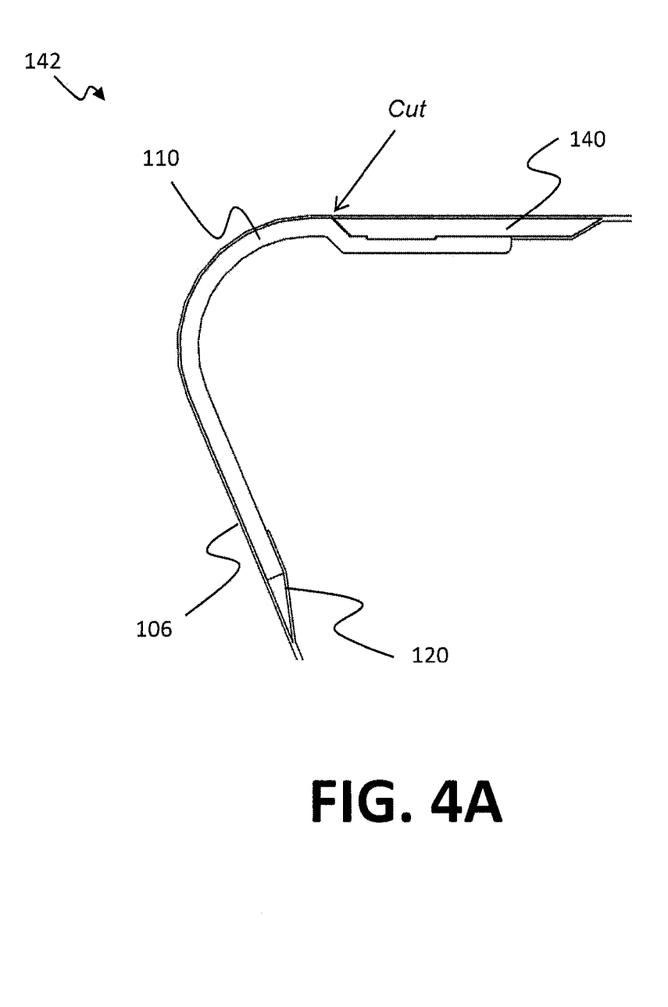
FIGS. 4A and 4B illustrate an additive manufactured sacrificial cap with an additive manufactured skin-joiner that are co-cured between composite layers according an exemplary embodiment.
Figure 4B:
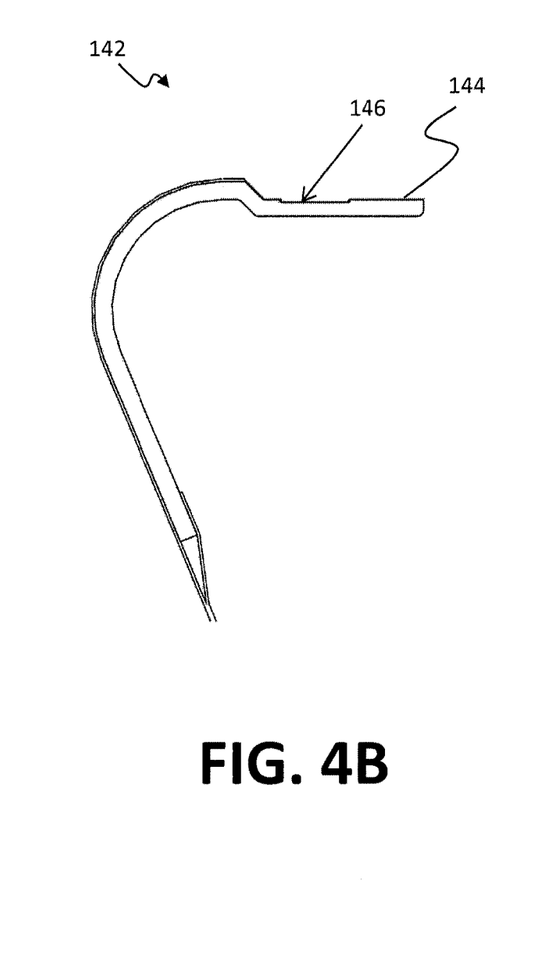

Another example of an additive manufactured sacrificial component is illustrated in FIGS. 4A and 4B. These figures illustrate an additive manufactured sacrificial cap 140 that is co-cured between composite layers 106, 120 with an additive manufactured skin joiner 142. The additive manufactured sacrificial cap 140 is removed, e.g., by cutting or trimming, following curing to expose a portion 144 of the skin joiner 142. The exposed portion 144 of the skin joiner includes an interface 146 that mates with a reciprocal interface of a skin joiner on a second composite structure (e.g., fuselage section) (not shown) to permit the composite structures to be secured to one another. The sacrificial cap 140 covers the interface 146 during the curing process and ensures that the interface remains clean for subsequent joining of the composite structures to one another.

Figure 5A:
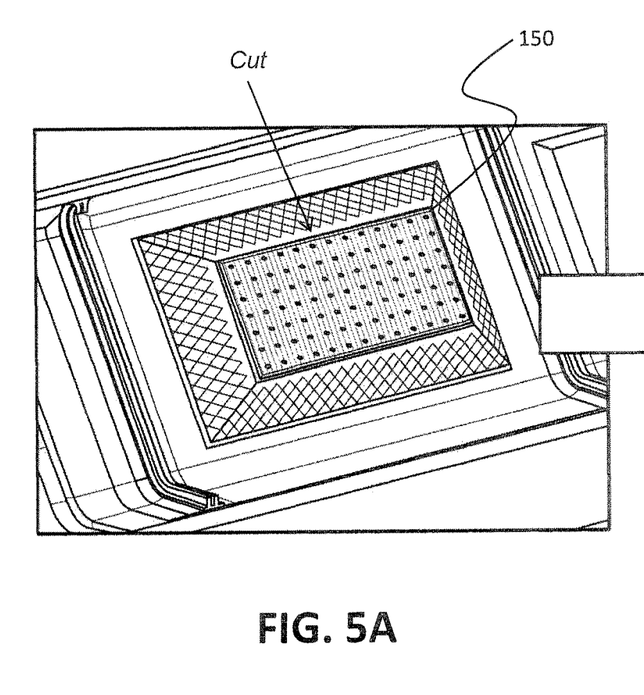
FIGS. 5A and 5B illustrate certain aspects of an additive manufactured sacrificial cap that is co-cured with an additive manufactured antenna between composite layers according to an exemplary embodiment.
Figure 5B:
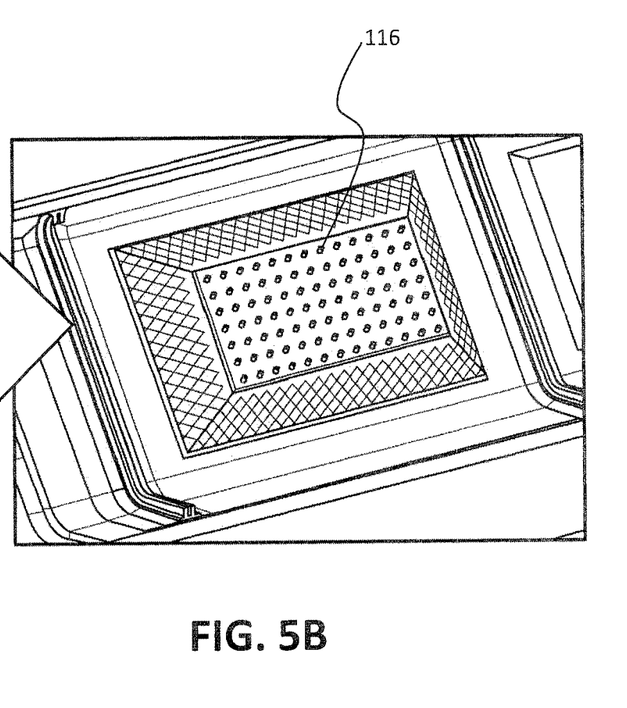

Similarly, FIGS. 5A and 5B illustrate an additive manufactured sacrificial cap that is co-cured with an additive manufactured antenna 116. The additive manufactured sacrificial cap 150 may be removed, e.g., by cutting or trimming, following curing to expose a portion (e.g., the RF ports) of the antenna. An advantage of the sacrificial cap 150 is that it serves to protect the embedded AM antenna during cure. Once cured, however, the sacrificial cap 150 can be removed to provide access to the antenna conduit and its electronics.

Figure 6A:
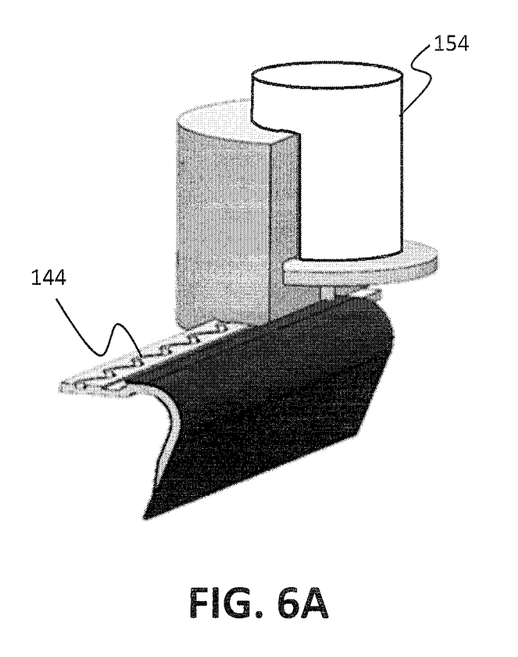
FIGS. 6A through 6C certain aspects of an additive manufactured skin joiner that is co-cured between composite layers according to an exemplary embodiment.
Figure 6B:
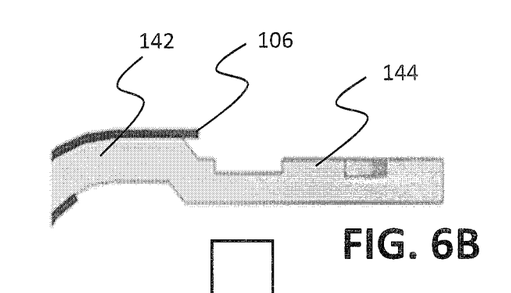
Figure 6C:
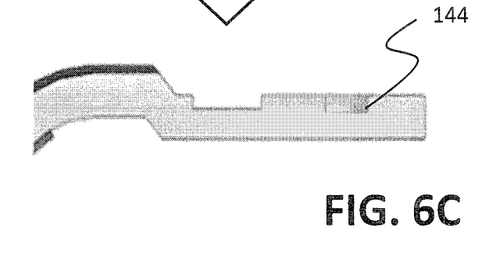

According to certain aspects of embodiments of the present disclosure, the additive manufactured components may incorporate features to facilitate post-curing removal of at least a portion of one of the first and second composite layers. For example, as is shown in FIGS. 6A through 6C, the exposed portion 144 of the skin joiner 142 can function as an index to guide a cutting tool 154, such as a router, to permit precise removal/trimming of the first (outer) composite layer 106 along an edge of the skin joiner, resulting in a clean interface for subsequent joining of the composite structures, e.g., fuselage sections, to one another.

As noted above, locating features may be provided to facilitate rapid and precise installation of the additive manufactured components relative to the composite layers. For example, the additive manufactured components may include printed markings, pins, stops, holes, guides, etc. to assist manufacturing technicians in position the additive manufactured components relative to one another and relative to the composite layers. According to one embodiment, the locating features may comprise magnetic locating features. For example, in certain embodiments magnets may be mounted in the tool 102 and the additive manufactured component. Alternatively, magnets may be mounted in tool 102 and a metallic element (or another magnet) may be mounted in the additive manufactured component or vice versa. The magnetic locating features may be used to properly and precisely orient the additive manufacture component relative to the tool 102 (and hence the first composite layer that is applied to the tooling surface).

Figure 7A:
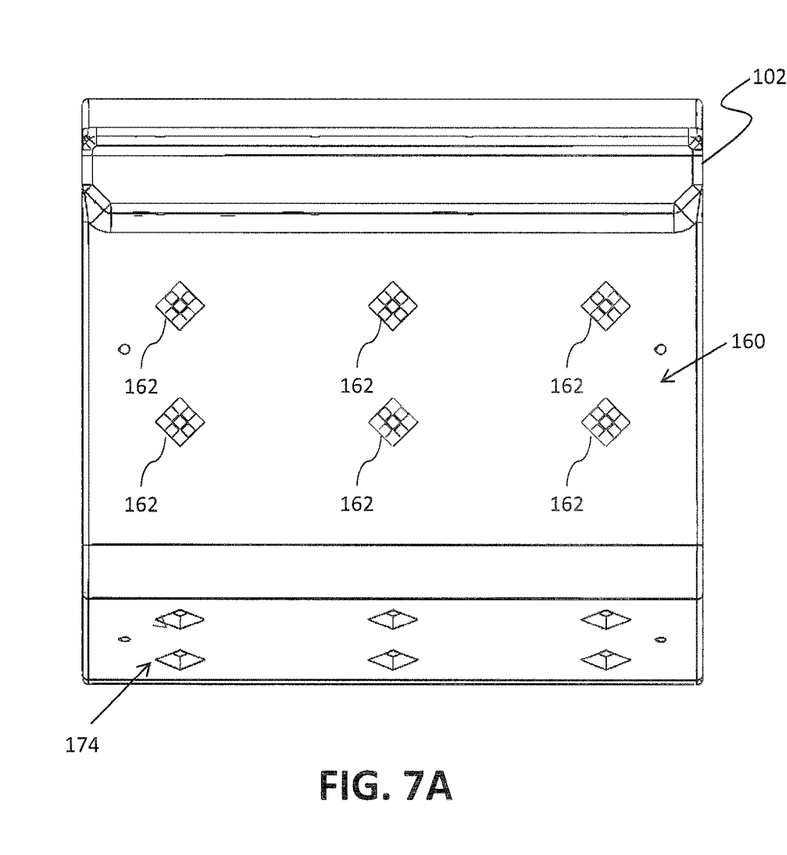
FIGS. 7A through 7D illustrate certain aspects of magnetic locating features according to an exemplary embodiment.
Figure 7B:
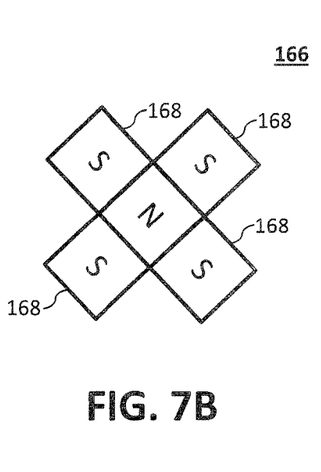
Figure 7C:
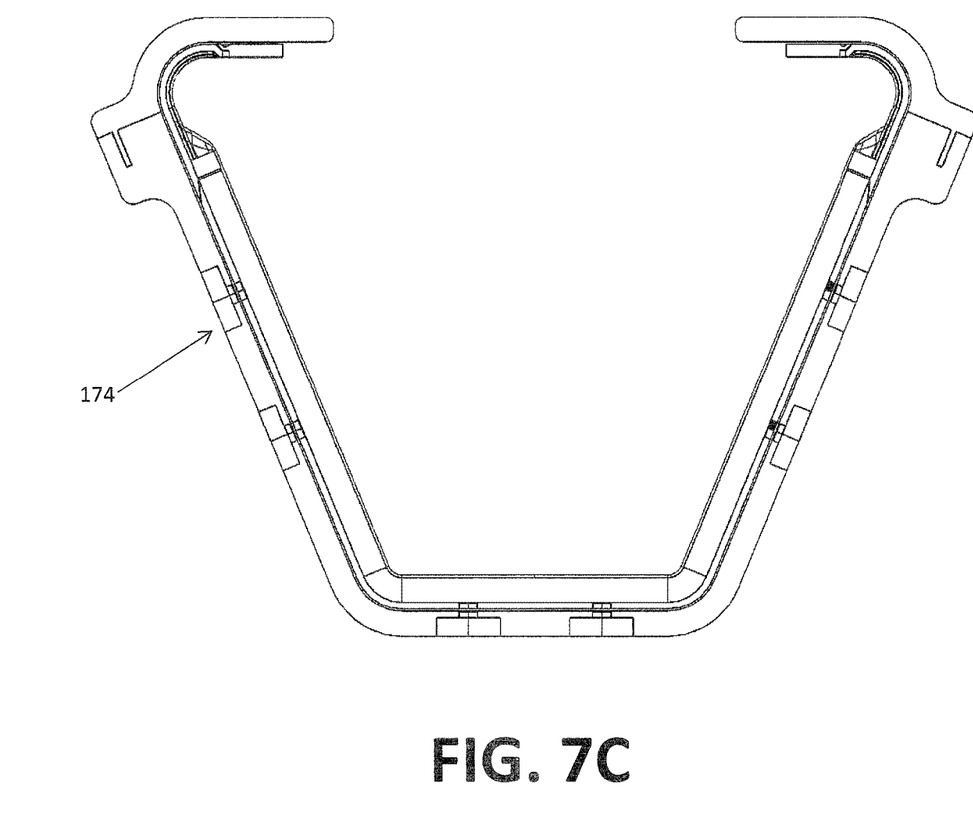
Figure 7D:
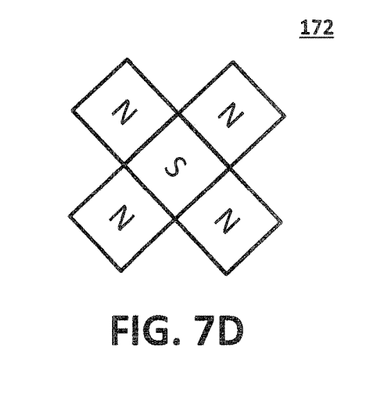

FIGS. 7A through 7C illustrate an exemplary embodiment of the magnetic locating features. As shown, an array 160 of magnetic elements 162 is positioned on the tool 102. In at least some embodiments, each magnetic element 162 is in the form of a magnetic subarray 166 consisting of a plurality of magnets 168 arranged in a predefined pattern. According to some aspects the magnetic subarray comprises a plurality of magnets arranged in an opposed pole relation, where at least some magnets are aligned with the North pole facing in a first direction (e.g., out of the plane of the page in FIG. 7B) and other magnets arranged with their North pole facing in the opposite direction (e.g., into the plane of the page in FIG. 7B). According to one particular embodiment, each magnetic subarray consists of a plurality of individual magnets arranged in an X-shape (see, e.g., FIGS. 7B and 7D). In at least some embodiments, each X-shaped subarray consists of a center, North-pole magnet (i.e., North pole facing out of the page) and four South-pole magnets (South pole facing out of the page) arranged along the edges of the North-pole magnet. This magnet arrangement makes is easier for the components to properly snapped into place.

In some embodiments, the magnetic subarrays are mounted in pockets 174 formed in the manufacturing tool 102. In the illustrated embodiment, the pockets are formed in a non-tooling portion of the tool 102. In other embodiments, however, it may be desirable to form the in the tooling surface of the tool. In the illustrated embodiment, the magnets 168 and pockets 174 are both square shaped, which helps to orient and support the magnets 168 within the pockets and relative to one another. Additive manufactured inserts (e.g., plastic squares, not shown) may be provided to fill the voids between the magnets 168 within the pocket 174. The additive manufactured inserts may be configured to fixedly secure the magnetic subarray in the pocket, e.g., by requiring the inserts to be press fit into the voids between the magnets 168 and the edges of the pocket.

Reciprocal magnetic elements (or metallic elements) carried by the additive manufactured components are configured to magnetically interface with the magnetic elements on the tool to position the additive manufactured component relative to the tool following application of the first composite layer. The magnetic interface between the tool and the additive manufactured component also functions to maintain the relative position of the additive manufactured component during subsequent application of the second composite layer and during the curing process. For example, magnetic elements mounted in the pi-clips magnetically interface with magnetic elements in the tool to orient the pi-clips relative to the tool and first composite layer. In some embodiments, the magnetic array carried by the tool includes pair of vertically aligned magnetic elements, where each pair is used position a pi-clip relative to the first composite layer. In at least some embodiments, each magnetic element carried by the additive manufactured component is in the form of a magnetic subarray 176 consisting of a plurality of magnets 168 arranged in a predefined pattern. According to one particular embodiment, each magnetic subarray consists of a plurality of individual magnets arranged in an X-shape. (See FIG. 7D). In at least some embodiments, each X-shaped subarray consists of a center south-pole magnet and four north-pole magnets arranged along the edges of the north-pole magnet, such that the magnetic subarrays 166, 172 are attracted to one another when the additive manufactured component is properly positioned over the tool.

While the present disclosure has been described with respect to what is presently considered the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation to encompass all such modifications and equivalent structures and functions.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A method of manufacturing a composite structure, comprising:
   applying a first composite layer to a tooling surface of a tool;
   positioning an additive manufactured component over at least a portion of the first composite layer;
   applying a second composite layer over at least a portion of the first composite layer and at least a portion of the additive manufactured component, wherein at least a portion of the additive manufactured component is embedded between the first and second composite layers; and
   removing at least a portion of one of the first or second composite layers to expose a portion of the additive manufactured component.

2. The method of claim 1, further comprising curing the composite structure after applying the second composite layer.

3. The method of claim 2, wherein the composite structure is cured prior to removing the portion of one of the first or second composite layers to expose a portion of the additive manufactured component.

4. The method of claim 3, further comprising providing the additive manufactured component with a feature to facilitate post-curing removal of the portion of one of the first or second composite layers.

5. The method of claim 4, wherein said feature is configured to interface with a cutting tool to facilitate post-curing removal of the portion of one of the first or second composite layers.

6. The method of claim 1, further comprising providing the additive manufactured component with a feature configured to mate with a second structure for interconnecting the composite structure with the second structure.

7. The method of claim 1, wherein the additive manufactured component is entirely embedded between the first and second composite layers.

8. The method of claim 1, further comprising removing a portion of each of the first and second composite layers to expose one or more portions of the additive manufactured component.

9. The method of claim 1, wherein the composite structure is cured prior to removing the portion of at least one of the first or second composite layers.

10. The method of claim 1, wherein removing the portion comprises cutting a portion of at least one of the first or second composite layers.

11. The method of claim 1, wherein the additive manufactured component comprises a printed thermoplastic material.

12. The method of claim 1, further comprising providing locating features on the tool and the additive manufactured component to facilitate orientation of the additive manufactured component relative to the tool.

13. The method of claim 12, wherein the locating features comprise magnets mounted in at least one of the tool and the additive manufactured component.

* * * * *